United States Patent
Nagasawa

(10) Patent No.: US 8,125,673 B2
(45) Date of Patent: Feb. 28, 2012

(54) IMAGE FORMING APPARATUS, RECORDING MEDIUM INCLUDING A RECORDED DATA PROCESSING PROGRAM

(75) Inventor: Kenichi Nagasawa, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1137 days.

(21) Appl. No.: 11/383,987

(22) Filed: May 18, 2006

(65) Prior Publication Data

US 2007/0013562 A1    Jan. 18, 2007

(30) Foreign Application Priority Data

Jul. 15, 2005   (JP) ................................. 2005-207039

(51) Int. Cl.
  *G06F 3/12*   (2006.01)
  *G06K 15/00*  (2006.01)
(52) U.S. Cl. ...................... 358/1.16; 358/1.13; 358/1.15
(58) Field of Classification Search ................. 358/1.16, 358/1.13, 1.15, 1.18, 1.9; 341/50; 709/208
  See application file for complete search history.

(56) References Cited

U.S. PATENT DOCUMENTS

| 6,832,273 | B2 | 12/2004 | Ray et al. | |
|---|---|---|---|---|
| 7,495,793 | B2* | 2/2009 | Kojima et al. | 358/1.16 |
| 2002/0188695 | A1* | 12/2002 | Tso | 709/218 |
| 2006/0146361 | A1* | 7/2006 | Adams et al. | 358/1.15 |

FOREIGN PATENT DOCUMENTS

| JP | 7-303166 | | 11/1995 |
|---|---|---|---|
| JP | 11-175696 | A | 7/1999 |
| JP | 2000-201263 | A | 7/2000 |
| JP | 2000-358207 | A | 12/2000 |
| JP | 2004-48349 | A | 2/2004 |
| JP | 2005-150940 | A | 6/2005 |

OTHER PUBLICATIONS

Official Action issued by the Japanese Patent Office in priority Japanese Patent Application No. 2005-207039; Aug. 14, 2007; and English translation thereof.

* cited by examiner

*Primary Examiner* — James A Thompson
(74) *Attorney, Agent, or Firm* — Buchanan Ingersoll & Rooney PC

(57) ABSTRACT

An image forming apparatus includes: a connection part for enabling an external memory apparatus to be connected thereto; a data retrieval part for retrieving output target data stored in the external memory apparatus connected to the connection part; an output part for outputting output target data retrieved from the external memory apparatus; a data writing part for writing saving target data into the external memory apparatus connected to the connection part; a determination part for, when the external memory apparatus is connected to the connection part, determining which one of a first mode and a second mode is a mode of a job intended for execution, wherein the first mode is a mode in which output target data stored in the external memory apparatus is retrieved and outputted and wherein the second mode is a mode in which saving target data is written and saved into the external memory apparatus; and a mode setting part for, based on the result of the determination made by the determination part, setting either one of the first mode and the second mode as the mode of the job intended for execution.

22 Claims, 6 Drawing Sheets

IMAGE FORMING APPARATUS, RECORDING MEDIUM INCLUDING A RECORDED DATA PROCESSING PROGRAM

This application claims priority under 35 U.S.C. §119 to Japanese Patent Application No. 2005-207039 filed on Jul. 15, 2005, the entire disclosure of which is incorporated herein by reference in its entirety.

BACKGROUND OF THE INVENTION

1. Field of the Invention

The present invention relates to an image forming apparatus, such as a printer or the like, to which an external memory apparatus, such as a Universal Serial Bus (USB) or the like, is connectable, and also relates to a recording medium including a recorded data processing program for causing a computer to execute data processing in the image forming apparatus.

2. Description of the Related Art

With the aid of a recent trend toward cost saving, the use of a USB memory as one of external memory apparatuses has been widespread. Following this spread of USB memorys, various apparatuses have been proposed which have a USB memory connection part that is configured to be connectable to a USB memory to thereby permit writing and saving various data into the USB memory and also retrieving data saved in the USB memory.

Japanese Unexamined Patent Publication No. H07-303166 discloses a facsimile apparatus to which an external memory apparatus, such as USB memory or the like, is connectable. The Japanese Unexamined Patent Publication No. H07-303166 states that, upon detection that a memory card is connected to a connection part, data stored in the memory card is automatically read.

An image forming apparatus or the like, for example, Multi Function Peripherals (MFP) as a multifunction complex machine, has not only a function of printing print data inputted from outside, but also has a function of saving image data obtained by scanning a document and a function of transmitting data to an external apparatus through a facsimile transmission function, a mail transmission function, or the like.

Thus, even when such an image forming apparatus is, by application of the technology stated in the patent document described above, provided with a connection part for an external memory apparatus, such as a USB memory or the like, only connection of the external memory apparatus to the connection part is not sufficient to indicate in which mode the user desires to execute a job: a mode in which data stored in the external memory apparatus is retrieved and outputted or a mode in which image data is saved into the external memory apparatus. Therefore, the user is required to voluntarily make, on the image forming apparatus, mode setting in accordance with a job the user desires to execute, which is expected to be far from being user-friendly.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a more user-friendly image forming apparatus capable of, when an external memory apparatus is connected to a connection part thereof, automatically performing mode setting in accordance with a job intended by a user for execution.

Among other potential advantages, some embodiments can provide a recording medium including a recorded data processing program for causing a computer to execute processing performed in the image forming apparatus.

According to a first aspect of the preferred embodiment of the present invention, an image forming apparatus comprising:

a connection part for enabling an external memory apparatus to be connected thereto;

a data retrieval part for retrieving output target data stored in the external memory apparatus connected to the connection part;

an output part for outputting output target data retrieved from the external memory apparatus;

a data writing part for writing saving target data into the external memory apparatus connected to the connection part;

a determination part for, when the external memory apparatus is connected to the connection part, determining which one of a first mode and a second mode is a mode of a job intended for execution, the first mode being a mode in which output target data stored in the external memory apparatus is retrieved and outputted, the second mode being a mode in which saving target data is written and saved into the external memory apparatus; and a mode setting part for, based on a result of the determination made by the determination part, setting either one of the first mode and the second mode as the mode of the job intended for execution.

According to a second aspect of the preferred embodiment of the present invention, recording medium including a recorded data processing program for causing a computer to execute steps of:

retrieving output target data stored in an external memory apparatus connected to a connection part of an image forming apparatus;

outputting output target data retrieved from the external memory apparatus;

writing saving target data into the external memory apparatus connected to the connection part;

determining, when the external memory apparatus is connected to the connection part, which one of a first mode and a second mode is a mode of a job intended for execution, the first mode being a mode in which output target data stored in the external memory apparatus is retrieved and outputted, the second mode being a mode in which saving target data is written and saved into the external memory apparatus; and setting, based on a result of the determination, either one of the first mode and the second mode as the mode of the job intended for execution.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
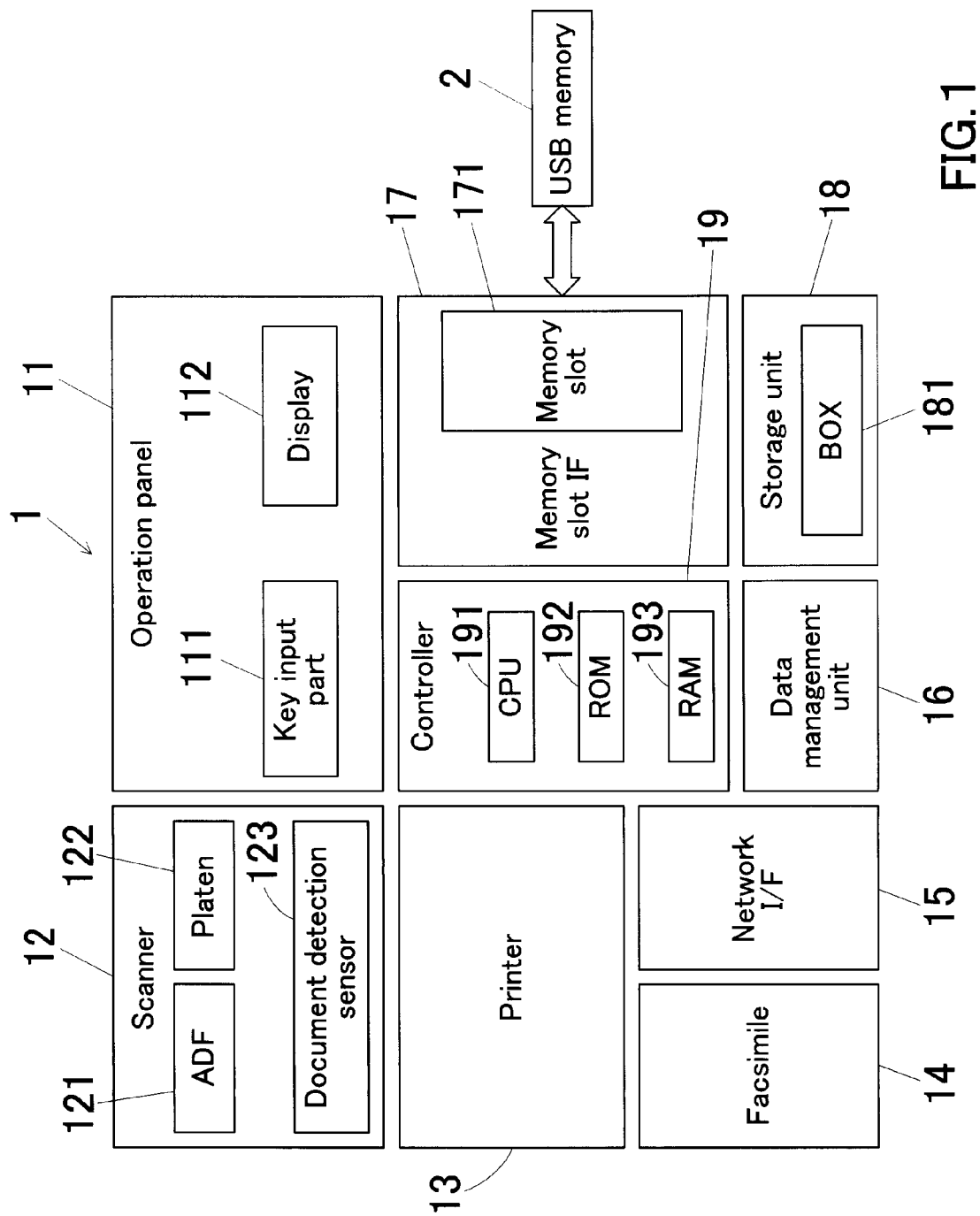
FIG. 1 is a schematic diagram of an image forming apparatus according to one embodiment of the present invention.

FIG. 1 is a schematic diagram of an MFP 1 as an image forming apparatus according to one embodiment of the present invention.

This MFP 1 has an operation panel 11, a scanner 12, a printer 13, a facsimile 14, a network interface (hereinafter referred to as "network IF") 15, a data management unit 16, a memory slot interface (hereinafter referred to as "memory slot IF") 17, a storage unit 18, and a controller 19.

The operation panel 11 includes: a key input part 111 including ten keys, a start key, and the like; and a display 112 of a touch-panel type made of liquid crystal or the like. On the operation panel 11, a user makes various inputs and a condition of the apparatus, an operation screen, and the like are displayed. In this embodiment, when a USB (Universal Serial Bus) memory 2 is connected to a memory slot 171 of the memory slot IF 17, an operation screen corresponding to a predetermined mode is automatically displayed on the display 112. This point will be described later.

The scanner 12 scans the image of a document and then converts it into image data. In this embodiment, the scanner 12 includes an automatic document feeder (hereinafter referred to as "ADF") 121 and a platen 122 both composing a document loading unit. The scanner 12 further includes a document detection sensor 123 for detection whether or not a document is set on the ADF 121 and/or the platen 122.

The printer 13 prints: print data transmitted from a user terminal, not shown; image data scanned by the scanner 12; image data stored in the storage unit 18; image data stored in the USB memory 2 connected to the memory slot 171; and the like.

The facsimile 14 performs facsimile transmission of image data scanned by the scanner 12 to an external apparatus through a phone line, or performs facsimile reception of image data from an external apparatus through the phone line.

The network IF 15 is provided for enabling communication via a network with an external apparatus, such as a personal computer. Through this network IF 15, image data scanned by the scanner 12, image data stored in the storage unit 18, image data stored in the USB memory 2, and the like can be transmitted as attached files to respective predetermined addresses by e-mail.

The data management unit 16 reads in data stored in the USB memory 2 connected to the memory slot 171 and writes data into the USB memory 2, based on instructions given by the controller 19.

The memory slot IF 17 includes the memory slot 171 serving as a connecting part for removably connecting the USB memory as an external memory apparatus, and performs data transmission and reception to and from the USB memory 2 connected to the slot 171.

The storage unit 18 is composed of, for example, a hard disc, and stores various data. This storage unit 18 is provided with a box 181 that can sort data for storage. Image data scanned by the scanner 12 can be, through user operation, stored into the box 181 or retrieved from the box 181.

The controller 19 includes a CPU 191, a ROM 192, a RAM 193, and the like, and integrally controls the entire MFP 1. In this embodiment, the controller 19 has: a function of detecting whether or not the USB memory 2 is connected to the memory slot 171; a function of determining whether or not a document has been detected by the document detection sensor 123 of the scanner 12; a function of determining the mode of a job intended by a user for execution when the USB memory 2 is connected to the memory slot 171; a function of, based on a determination result, setting the mode of the job intended by the user for execution and displaying on the display 112 of the operation panel 11 an operation screen corresponding to the set mode, and the like.

Figure 5:
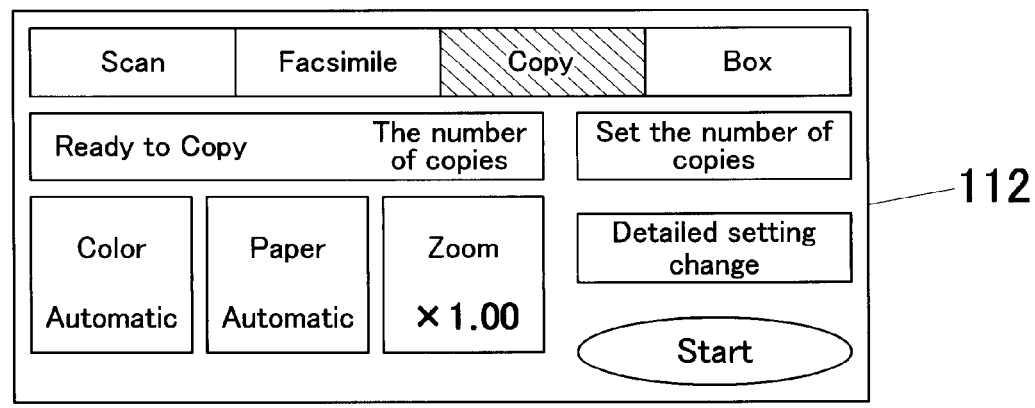
FIG. 5 is a default operation screen.

FIG. 5 shows a default operation screen displayed on the display 112 of the operation panel 11. This screen is displayed when the USB memory 2 is not connected to the memory slot 171, for example, after power-on.

Displayed on this operation screen are: a "Scan" key for transmitting image data scanned by the scanner 12 and image data stored in the box 181 of the storage unit 18 to an external apparatus by e-mail; a "Fax" key for performing facsimile transmission of the aforementioned image data; a "Copy" key for printing image data scanned by the scanner 12; a "Box" key for storing image data scanned by the scanner 12 into the box 181 of the storage unit 18; operating conditions for a mode corresponding to a selected key, and the like.

For example, in FIG. 5, the "Copy" key is selected (selected key is indicated with hatching), and the number of copies, whether color or monochrome output, the paper type, the magnification, and the like can be set on the screen.

Upon the connection of the USB memory 2 to the memory slot 171 with this default operation screen being displayed, the CPU 191 of the controller 19 determines whether the intended mode is a first mode in which output target data stored in the USB memory 2 is retrieved and outputted, or a second mode in which image data scanned by the scanner 12 or image data stored in the box 181 of the storage unit 18 is written and saved into the USB memory 2. Subsequently, based on the determination result, the CPU 191 displays on the display 112 of the operation panel 11 an operation screen corresponding to the first mode or an operation screen corresponding to the second mode.

The first mode is, for example, a mode in which output target data stored in the USB memory 2 is retrieved and printed, a mode in which the aforementioned data is transmitted by facsimile, or a mode in which the aforementioned data is transmitted to an external apparatus by mail.

Referring to a flowchart of FIG. 6, a description will be given on the mode setting processing and operation screen display control processing performed by the CPU 191 of the controller 19 in the manner as described above. The processing is executed by the CPU 191 retrieving a program recorded on the recording medium, such as the ROM 192, and then performing its operation.

In step S11, the CPU 191 determines whether or not the USB memory 2 is connected to the memory slot 171. If the USB memory 2 is not connected to the memory slot 171 (i.e., determination in step S11 is NO), the processing ends. In this case, therefore, the default operation screen shown in FIG. 5 remains displayed on the display 112.

If the USB memory 2 is connected to the memory slot 171 (i.e., determination in step S11 is YES), in step S12, the CPU determines, based on an output provided by the document detection sensor 123, whether or not a document is set on the document loading unit, i.e., the platen 122 or the ADF 121.

Figure 2:
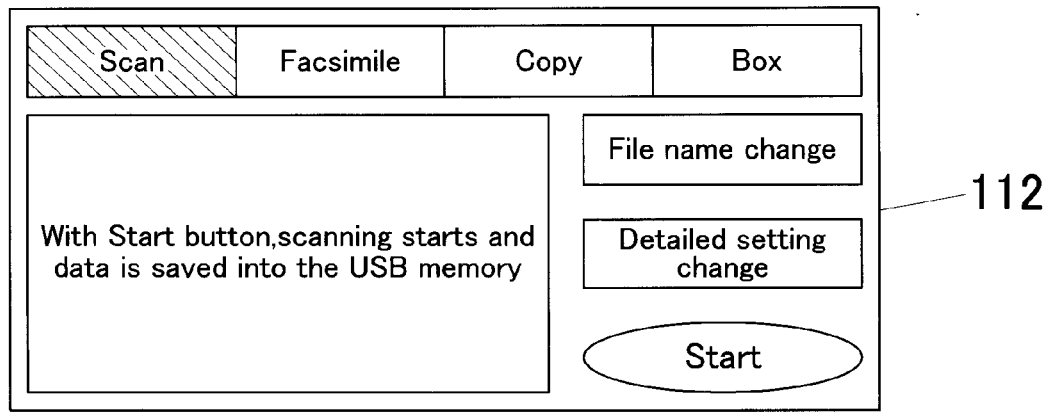
FIG. 2 is an operation screen corresponding to a second mode.

If a document is set on the document loading unit (i.e., determination in step S12 is YES), based on the assumption that the user has connected the USB memory to the memory slot 171 in order to save image data of the document scanned by the scanner 12 into the USB memory 2, the CPU 191 determines that the mode of a job intended by the user for execution is the second mode. Then, in step S15, the CPU 191 sets the second mode as the mode of the job intended by the user for execution, and causes transition of the operation screen displayed on the display 112 of the operation panel 11 from the default operation screen shown in FIG. 5 to an operation screen for the second mode as shown in FIG. 2.

On this operation screen for the second mode, a message is displayed, indicating that, by pressing a "Start" button, document scanning by the scanner 12 can be started and obtained image data can be saved into the USB memory 2.

Thus, when the user presses the "Start" button, document scanning by the scanner 12 starts and obtained image data is written and saved into the USB memory 2.

Referring back to FIG. 6, if no document is set on the platen 122 or the ADF 121 (i.e., determination in step S12 is NO), in step S13, the CPU 191 determines whether or not the USB memory 2 has a data with an extension, for example, data with an extension such as PDF (Portable Document Format), TIFF (Tagged Image File Format), or the like, that can be subjected to printing, facsimile transmission, or mail transmission performed by the MPF 1.

If the USB memory 2 has any data with an extension that can be subjected to printing or the like (i.e., determination in step S13 is YES), based on the assumption that the user has connected the USB memory 2 to the memory slot 171 in order to output data stored in the USB memory 2, the CPU 191 determines that the mode of the job intended by the user for execution is the first mode. Then, in step S14, the CPU 191 sets the first mode as the mode of the job intended by the user for execution, then reads in these data through the data management unit 16, and also causes transition of the operation screen displayed on the display 112 of the operation panel 11 from the default screen shown in FIG. 5 to an operation screen for the first mode as shown in FIG. 3.

On this operation screen for the first mode, a list of data which can be subjected to printing or the like and also which has been read from the USB memory 2, is displayed, with a "Print" key being selected. Thus, the user can simply select data to be printed and then press a "Start" button to print the selected data.

Figure 4:
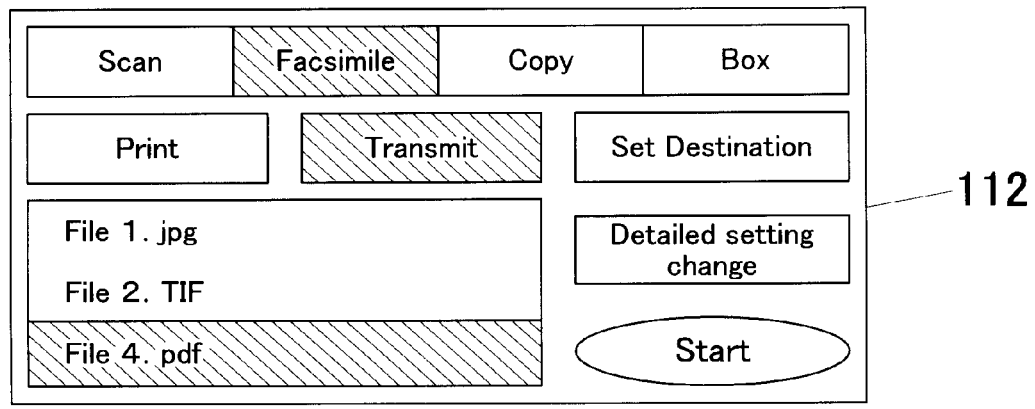
FIG. 4 is a screen appearing when a "Transmit" key is pressed on the operation screen of FIG. 3.

If the user desires facsimile transmission instead of printing operation, as shown in FIG. 4, the user can select data to be transmitted, press a "Transmit" key, and further press a "Start" button to immediately start facsimile transmission. Moreover, if the user desires data transmission by e-mail, the user can press a "Scan" key, select data to be transmitted, press the "Transmit" key, and then press the "Start" button to achieve data transmission by e-mail.

Figure 3:
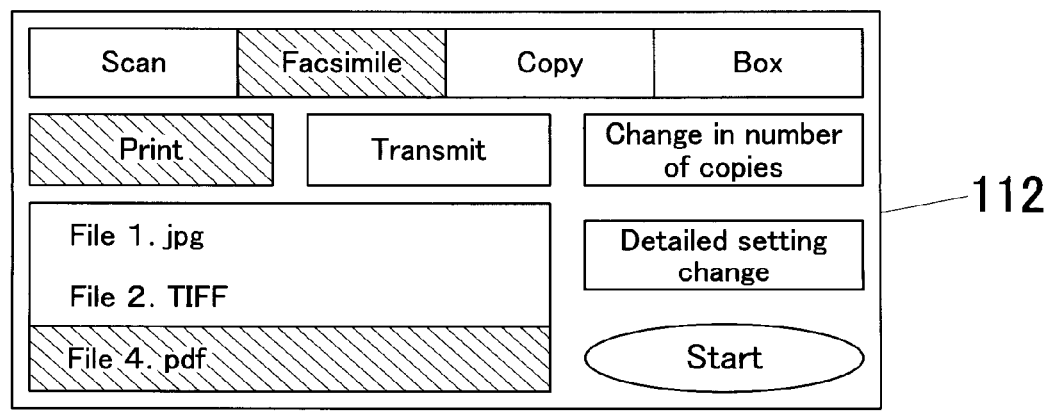
FIG. 3 is an operation screen corresponding to a first mode.

As an alternative operation screen for the first mode that is displayed when the USB memory 2 is connected to the memory slot 171, instead of the screen for printing as shown in FIG. 3, an operation screen for facsimile transmission or mail transmission may be displayed immediately.

Figure 6:
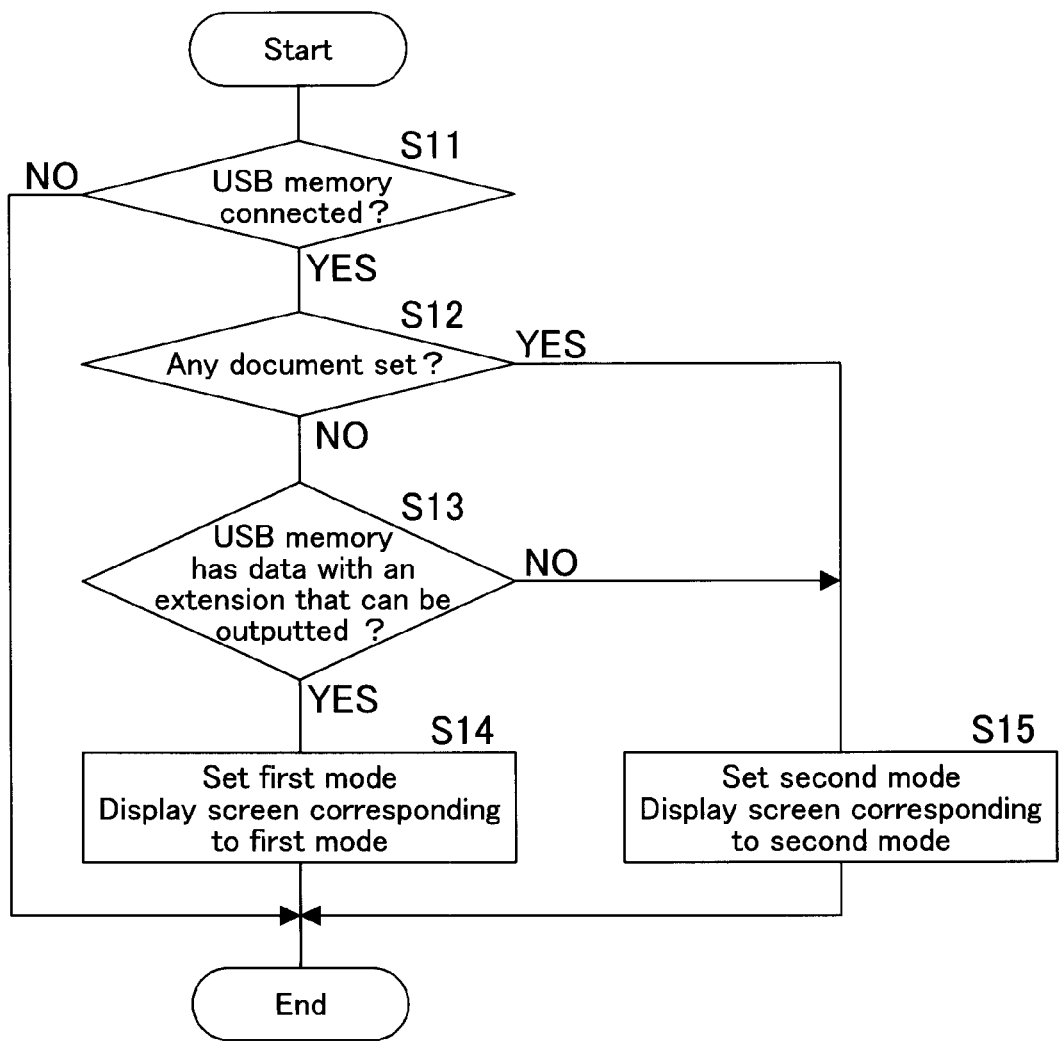
FIG. 6 is a flowchart of mode setting and display control processing performed by a CPU in the image forming apparatus shown in FIG. 1.

In step S13 of FIG. 6, if the USB memory has no data with an extension that can be subjected to printing or the like (i.e., determination in step S13 is NO), based on the assumption that, although the user intends to save image data of a document scanned by the scanner 12 into the USB memory 2, the document has not yet been set, or that the user intends to transfer image data stored in the box 181 of the storage unit 18 to the USB memory 2, the CPU 191 determines that the mode of the job intended by the user for execution is the second mode. Then, in step S15, the CPU 191 sets the second mode as the mode of the job intended by the user for execution, and then displays on the display 112 of the operation panel 11 the operation screen for the second mode as shown in FIG. 2.

In this case, instead of the screen of FIG. 2, an operation screen for transferring the image data from the box 181 to the USB memory 2 can be displayed immediately, together with a list of image data stored in the box 181, as the operation screen provided after the detection that the USB memory 2 has been connected.

As described above, in this embodiment, when the USB memory 2 is connected to the memory slot 171, the CPU determines whether the mode of the job intended by the user for execution is the first mode or the second mode, sets a mode in accordance with the user's intention, and then displays an appropriate operation screen on the display 112 of the operation panel 11. Consequently, the user is no longer required to set the first or second mode. Moreover, operation that has been required in conventional practices for displaying the operation screens shown in FIGS. 2 and 3 is no longer required, thus saving operation labor and improving user friendliness accordingly.

Figure 7:
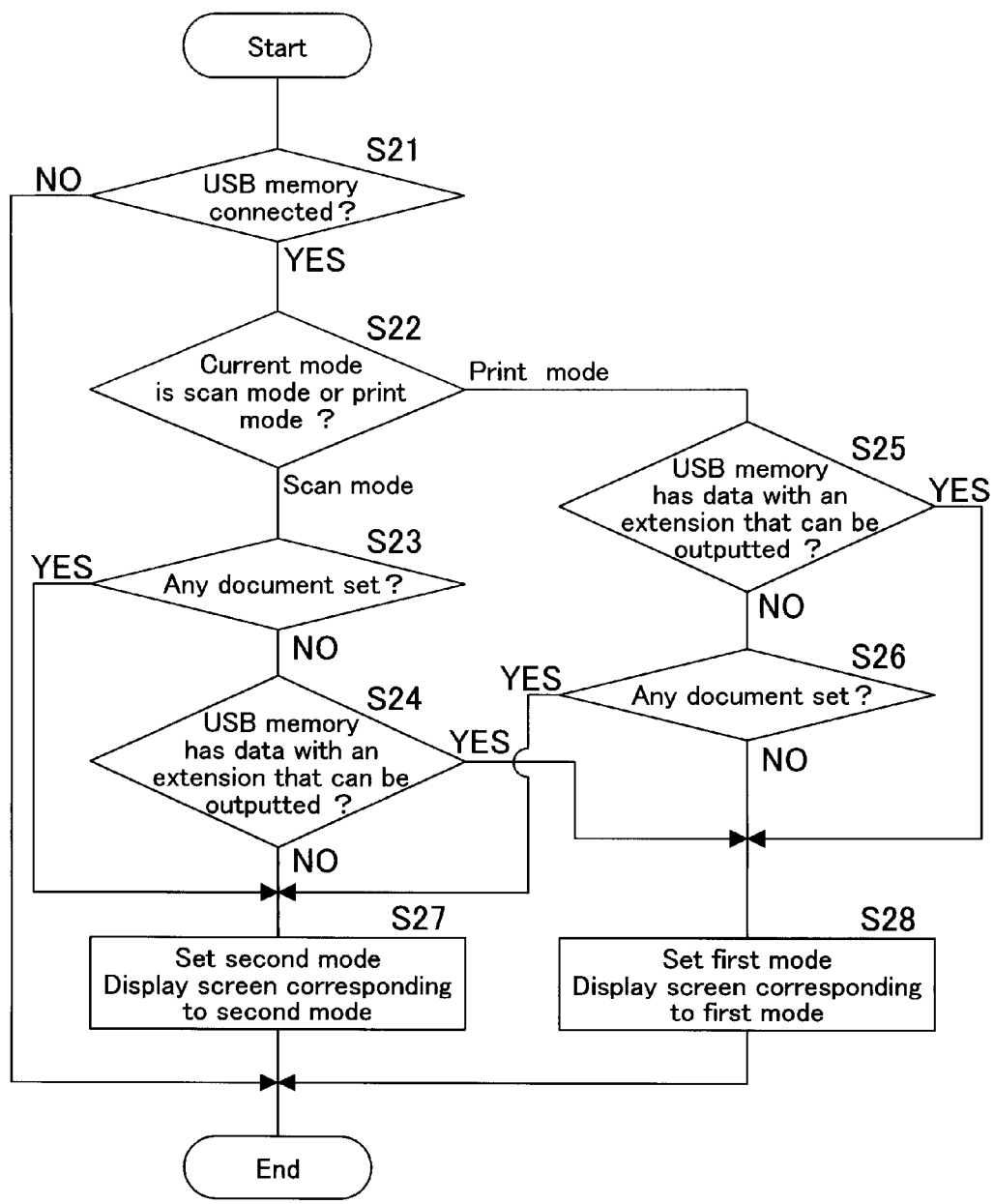
FIG. 7 is a flowchart of another mode setting and display control processing performed by a CPU in the image forming apparatus shown in FIG. 1.

FIG. 7 shows another embodiment of the present invention, with a flowchart illustrating processing performed, in accordance with the mode currently set on the operation panel 11, by the CPU 191 for achieving mode setting and display screen switching control at the time of the USB memory. The processing is also executed by the CPU 191 retrieving a program recorded on the recording medium, such as the ROM 192, and then performing its operation.

In step S21, the CPU 191 determines whether or not the USB memory 2 is connected to the memory slot 171. If the USB memory 2 is not connected to the memory slot 171 (i.e., determination in step S21 is NO), the processing ends. If the USB memory 2 is connected to the memory slot 171 (i.e., determination in step S21 is YES), in step S22, the CPU 191 determines whether the current mode is set at a scan mode in which a document is scanned by the scanner 12 or at a print mode.

If the current mode is set at the scan mode, the processing proceeds to step S23. If the current mode is set at the print mode, the processing proceeds to step S25. In the case of the scan mode, the operation screen corresponding to the scan mode as shown in FIG. 2 is displayed on the display 112 of the operation panel 11. In the case of the print mode, the operation screen corresponding to the print mode as shown in FIG. 3 is displayed on the display 112 of the operation panel 11.

In step S23, the CPU determines, based on an output provided by the document detection sensor 123, whether or not a document is set on the document loading unit, i.e., the platen 122 or the ADF 121.

If a document is set on the platen 122 or the ADF 121 (i.e., determination in step S23 is YES), it is assumed that the user intends to save image data of the document scanned by the scanner 12 into the USB memory. Therefore, the second mode is to be set, and the operation screen shown in FIG. 2 is to be displayed on the display 112 of the operation panel 11. Since the mode has been set at the scan mode even before the USB memory 2 is connected to the memory slot 171, in step S27, the CPU 191 keeps the mode set at the second mode and the screen displayed on the display 112 of the operation panel 11 without making any modifications.

If no document is set on the platen 122 or the ADF 121 (i.e., determination in step S23 is NO), in step S24, the CPU 191 determines whether or not the USB memory 2 has a data with an extension, such as PDF, TIFF, or the like, that can be subjected to printing or the like performed by the MPF 1.

If the USB memory 2 has any data with an extension that can be subjected to printing or the like (i.e., determination in step S24 is YES), based on the assumption that the user has connected the USB memory 2 to the memory slot 171 in order to subject the data stored in the USB memory 2 to printing or the like, in step S28, the CPU 191 sets the first mode, then reads in these data through the data management unit 16, and also causes transition of the screen displayed on the display 112 of the operation panel 11 to the screen for the first mode as shown in FIG. 3.

On the other hand, if the USB memory 2 has no data with an extension that can be subjected to printing or the like (i.e., determination in step S24 is NO), based on the assumption that, although the user intends to save image data of a document scanned by the scanner 12 into the USB memory 2, the document has not yet been set, or that the user intends to transfer image data stored in the box 181 of the storage unit 18 to the USB memory 2, in step S27, the CPU 191 keeps the set mode and the screen displayed on the display 112 of the operation panel 11 without making any modifications.

In step S22, if the current mode is set at the print mode, the processing proceeds to step S25 as described above, and the CPU 191 determines whether or not the USB memory 2 has a data with an extension, such as PDF, TIFF, or the like, that can be subjected to printing or the like performed by the MFP 1.

If the USB memory 2 has any data with an extension that can be subjected to printing or the like (i.e., determination in step S25 is YES), it is assumed that the user has connected the USB memory 2 to the memory slot 171 in order to subject the data stored in the USB memory 2 to printing or the like. Therefore, the first mode is to be set, and the operation screen shown in FIG. 3 is to be displayed on the display 112 of the operation panel 11. Since the mode has been set at the print mode even before the USB memory 2 is connected to the memory slot 171, in step S28, the CPU 191 keeps the set mode and the screen displayed on the display 112 of the operation panel 11 without making any modifications, also reads in these data through the data management unit 16, and additionally displays a list of the read image data that can be subjected to printing or the like.

On the other hand, if the USB memory has no data with an extension that can be subjected to printing or the like (i.e., determination in step S25 is NO), in step S26, the CPU 191 determines whether or not a document is set on the platen 122 or the ADF 121. If a document is set on the platen 122 or the ADF 121 (i.e., determination in step S26 is YES), based on the assumption that image data of the document scanned by the scanner 12 is to be saved into the USB memory 2 in step S27, the CPU 191 sets the second mode, and causes transition of the screen displayed on the display 112 of the operation panel 11 to the screen for the second mode as shown in FIG. 1.

If no document is set on the platen 122 or the ADF 121 (i.e., determination in step S26 is NO), in step S28, the CPU 191 keeps the set mode and the screen displayed on the display 112 of the operation panel 11 without making any modifications (leaves the mode as the print mode), and puts the user in change of further manual operation.

As described above, in the embodiment shown in FIG. 7, when the USB memory 2 is connected to the memory slot 171, in a manner corresponding to the mode currently set, the CPU 191 determines whether the current mode is to be set at the first mode or the second mode, then sets a mode in accordance with the user's intention, and then displays an appropriate operation screen on the display 112 of the operation panel 11. Consequently, the user is no longer required to set the first or second mode. Moreover, no operation is required for displaying an operation screen corresponding to the set mode, thereby saving operation labor and improving user friendliness.

In the processing of FIG. 7, the mode setting and the display screen control are performed in accordance with the mode currently set. In a case where the scan mode or the print mode can be selectively set as a default mode, when the default mode is set at the scan mode or the print mode, mode setting processing and display control processing to be performed when the USB memory 2 is connected to the memory slot 171 can be achieved in the same manner as described above.

Figure 8:
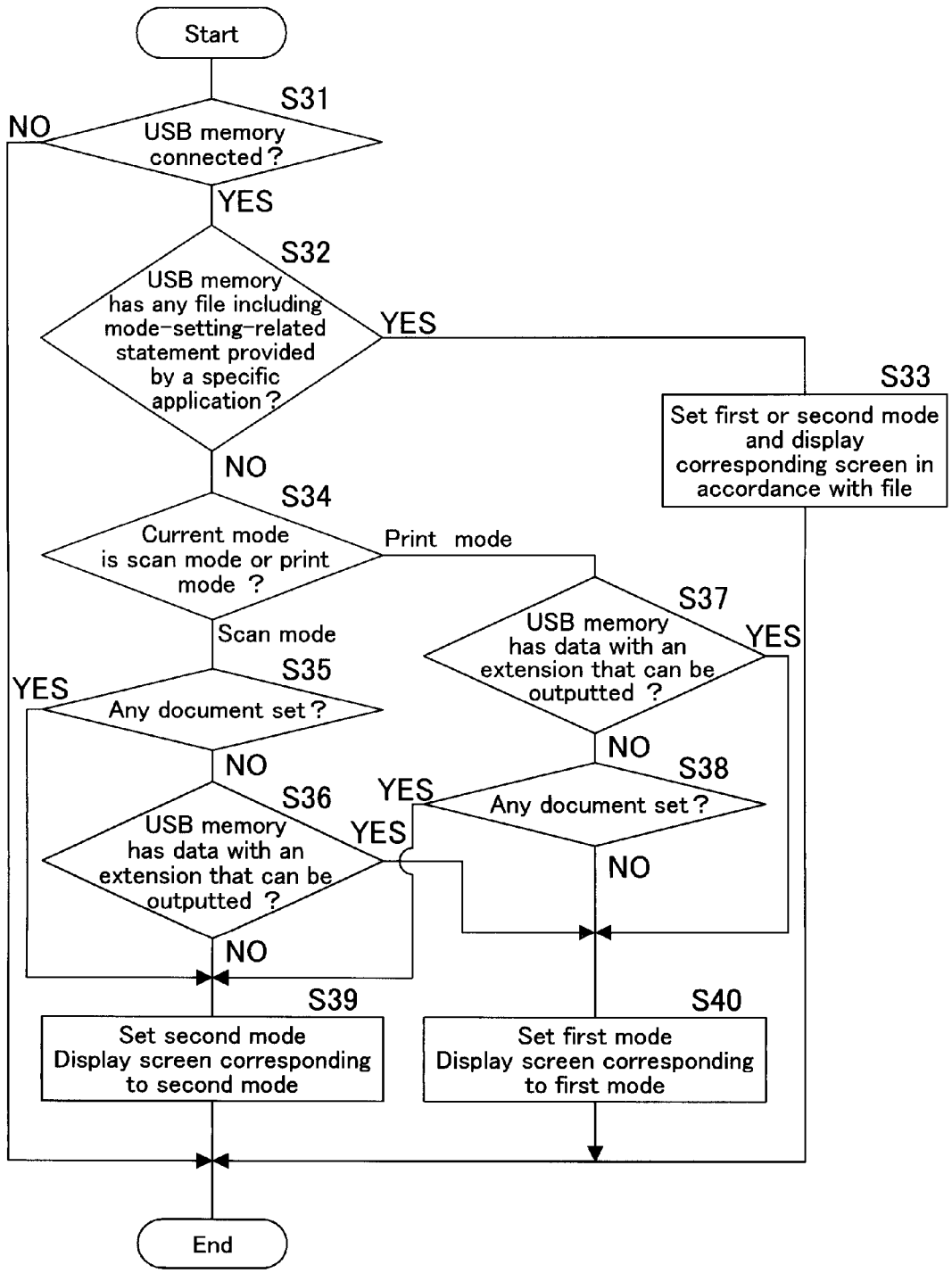
FIG. 8 is a flowchart of still another mode setting and display control processing performed by a CPU in the image forming apparatus shown in FIG. 1.

FIG. 8 shows still another embodiment of the present invention.

In this embodiment, based on whether the USB memory 2 has a file which has been set, by a specific application software for retrieving data from the USB memory 2, for retrieval, or a file which has been set, by a specific application software, for image data writing, the CPU 191 performs mode setting and display screen control at the time of connection of the USB memory 2. FIG. 8 is a flowchart showing the processing performed in such a case. The processing is also executed by the CPU 191 retrieving a program recorded on the recording medium, such as the ROM 192, and then performing its operation.

In step S31, the CPU 191 determines whether or not the USB memory 2 is connected to the memory slot 171. If the USB memory 2 is not connected to the memory slot 171 (i.e., determination in step S31 is NO), the processing ends. If the USB memory 2 is connected to the memory slot 171 (determination in step S31 is YES), in step S32, the CPU 191 examines whether or not the USB memory 2 has a file that includes mode-setting-related statement written by a specific application software.

Such a file is created and then saved into the USB memory 2 by an external personal computer where the specific application is installed.

If the USB memory 2 has any file that includes mode-setting-related statement written by the specific application software (i.e., determination in step S32 is YES), in step S33, the CPU 191 sets the first mode or the second mode in accordance with this file, and then displays on the display 112 of the operation panel 11 an operation screen corresponding to the set mode. If the USB memory 2 has no file that includes mode-setting-related statement written by the specific application software (i.e., determination in step S32 is NO), the processing proceeds to step S34, where the CPU 191 determines whether the mode currently set on the operation panel 11 is the scan mode or the print mode.

As described above, based on the determination whether or not the USB memory 2 has a file that includes mode-setting-related statement written by the specific application software, the CPU 191 determines whether the mode to be set is the first mode or the second mode, sets an appropriate mode in accordance with the determination result, and then automatically displays an appropriate operation screen on the display 112 of the operation panel 11, which is convenient and user-friendly.

Steps S34 to S40 are identical to steps S22 to S28 shown in FIG. 7, and thus are omitted from description.

It should be noted that the present invention is not limited to the embodiments described above. For example, the USB memory 2 is used as an external memory apparatus in these embodiments. Other portable recording mediums, such as a portable hard disc device, an optical disc, a semiconductor memory, a magnetic memory, an SD card, an IC card, and the like, can also be used as the external memory apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image forming apparatus comprising:
a connection part for enabling an external memory apparatus to be connected thereto;
a data retrieval part for retrieving output target data stored in the external memory apparatus connected to the connection part;
an output part for outputting output target data retrieved from the external memory apparatus;
a data writing part for writing saving target data into the external memory apparatus connected to the connection part;
a document scanning part for scanning a document;
a document detector for detecting whether or not the document is set on a document loading portion of the document scanning part;
an external memory apparatus detector for detecting whether or not the external memory apparatus is connected to the connection part;
a determination part which automatically determines that a mode of a job intended for execution is a first mode in which output target data stored in the external memory apparatus is retrieved and outputted in a case that the document detector detects no document on the document loading portion and that the external memory apparatus detector detects that the external memory apparatus is connected to the connection part, and automatically determines that the mode of the job intended for execution is a second mode in which saving target data is written and saved into the external memory apparatus in a case that the document detector detects a document on the document loading portion and that the external memory apparatus detector detects that the external memory apparatus is connected to the connection part; and
a mode setting part for, based on a result of the determination made by the determination part, setting either one of the first mode and the second mode as the mode of the job intended for execution.

2. The image forming apparatus according to claim 1, further comprising:
a display for displaying an operation screen; and
a display controller for, in accordance with either one of the first mode and the second mode set by the mode setting part, causing an operation screen corresponding to the set mode to be displayed on the display.

3. The image forming apparatus according to claim 1, wherein in a case that the document detector detects no document, the external memory apparatus detector detects that the external memory apparatus is connected to the connection part and the external memory apparatus has no file that can be outputted, the determination part determines that the mode of the job intended for execution is the second mode.

4. The image forming apparatus according to claim 3, wherein the file that can be outputted is detected based on an extension of the file.

5. The image forming apparatus according to claim 1, wherein in a case that the document detector detects no document, the external memory apparatus detector detects that the external memory apparatus is connected to the connection part and the external memory apparatus has a file that can be outputted, the determination part determines that the mode of the job intended for execution is the first mode.

6. The image forming apparatus according to claim 5, wherein the file that can be outputted is detected based on an extension of the file.

7. The image forming apparatus according to claim 1, wherein the determination part determines that the mode of the job intended for execution is the first mode in a case where the external memory apparatus detector detects that the external memory apparatus is connected to the connection part and the external memory apparatus has a file that has been set, by a specific application software for retrieving data from the external memory apparatus, for retrieval, while the determination part determines that the mode of the job intended for execution is the second mode in a case where the external memory apparatus detector detects that the external memory apparatus is connected to the connection part and the external memory apparatus has a file that has been set, by a specific application software, for image data writing.

8. The image forming apparatus according to claim 1, wherein the output part is a printer for printing data retrieved from the external memory apparatus.

9. The image forming apparatus according to claim 1, wherein the output part is a transmitter for transmitting to an external apparatus data retrieved from the external memory apparatus.

10. The image forming apparatus according to claim 1, wherein the saving target data is image data obtained from a document.

11. The image forming apparatus according to claim 1, wherein the saving target data is data stored in a memory part that is different from the external memory apparatus.

12. The image forming apparatus according to claim 1, wherein the mode setting part sets either one of the first mode and the second mode as the mode of the job intended for execution based on the result of the determination made by the determination part without any need for a user operation.

13. The image forming apparatus according to claim 1, wherein, during the setting step, either one of the first mode and the second mode is set as the mode of the job intended for execution based on the result of the determination made by the determination part without any need for a user operation.

14. A nontransitory recording medium including a recorded data processing program for causing a computer to execute steps of:
retrieving output target data stored in an external memory apparatus connected to a connection part of an image forming apparatus;
outputting output target data retrieved from the external memory apparatus;
writing saving target data into the external memory apparatus connected to the connection part;
detecting whether or not a document is loaded on a document loader of a document scanner;
detecting whether or not the external memory apparatus is connected to the connection part;
automatically determining that a mode of a job intended for execution is a first mode in which output target data stored in the external memory apparatus is retrieved and outputted in a case that no document is detected as being loaded on the document loader and that the external memory apparatus is detected to be connected to the connection part, and automatically determining that the mode of the job intended for execution is a second mode in which saving target data is written and saved into the external memory apparatus in a case that a document is detected as being loaded on the document loader and that the external memory apparatus is detected to be connected to the connection part; and
setting, based on a result of the determination, either one of the first mode and the second mode as the mode of the job intended for execution.

15. The recording medium according to claim 14, wherein the program further causes the computer to execute a step of displaying, in accordance with either one of the first mode and the second mode set by the mode setting step, an operation screen corresponding to the set mode on a display.

16. The recording medium according to claim 14, wherein in a case that the external memory apparatus is detected to be connected to the connection part, the document detection step detects no document and the external memory apparatus has no file that can be outputted, the determination step determines that the mode of the job intended for execution is the second mode.

17. The recording medium according to claim 14, wherein in a case that that the external memory apparatus is detected to be connected to the connection part, the document detection step detects no document and the external memory apparatus has a file that can be outputted, the determination step determines that the mode of the job intended for execution is the first mode.

18. The recording medium according to claim 14, wherein the determination step determines that the mode of the job intended for execution is the first mode in a case that the external memory apparatus is detected to be connected to the connection part, and the external memory apparatus has a file that has been set, by a specific application software for retrieving data from the external memory apparatus, for retrieval, while the determination step determines that the mode of the job intended for execution is the second mode in a case that the external memory apparatus is detected to be connected to the connection part, and the external memory apparatus has a file that has been set, by a specific application software, for image data writing.

19. The recording medium according to claim 14, wherein the output step is a print step for printing data retrieved from the external memory apparatus.

20. The recording medium according to claim 14, wherein the output step is a transmission step for transmitting to an external apparatus data retrieved from the external memory apparatus.

21. The recording medium according to claim 14, wherein the saving target data is image data obtained from a document.

22. The recording medium according to claim 14, wherein the saving target data is data stored in a memory part that is different from the external memory apparatus.

* * * * *